Figure 1:
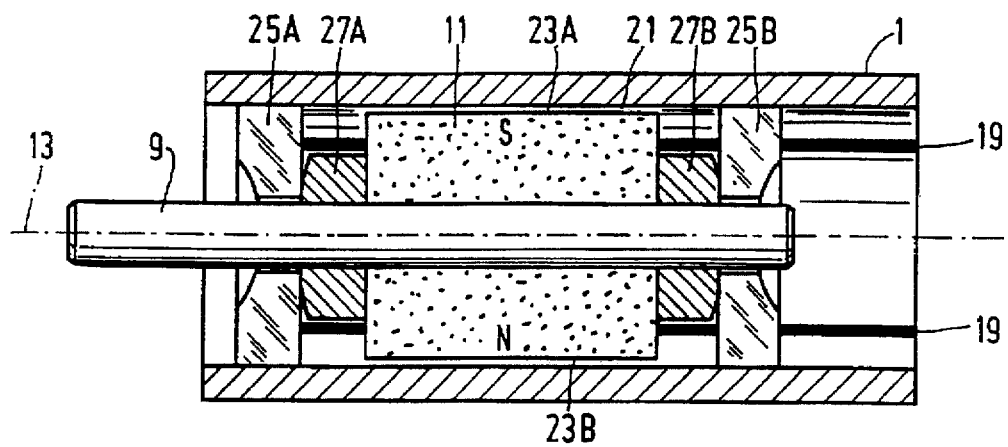

US005677579A

United States Patent [19]
Dona et al.

[11] Patent Number: 5,677,579
[45] Date of Patent: Oct. 14, 1997

[54] ELECTRIC MICROMOTOR WITH A SLOTTED CONDUCTIVE BODY AS THE STATOR WITH INSULATING REINFORCEMENT IN THE SLOTS THEREOF

[75] Inventors: Marinus J. J. Dona, Eindhoven; Arie J. C. Bakhuizen, Mierlo; Paulus A. F. M. Goemans, Sint-Oedenrode; Evert M. H. Kamerbeek, Eindhoven, all of Netherlands

[73] Assignee: U.S. Philips Corporation, New York, N.Y.

[21] Appl. No.: 447,379

[22] Filed: May 23, 1995

[30] Foreign Application Priority Data

May 26, 1994 [EP] European Pat. Off. .............. 94201498

[51] Int. Cl.$^6$ ...................................... H02K 1/12
[52] U.S. Cl. ...................... 310/40 MM; 310/258; 310/180
[58] Field of Search ................... 310/40 MM, 258, 310/254, 183, 211, 180, 181, 182

[56] References Cited

U.S. PATENT DOCUMENTS

| | | | |
|---|---|---|---|
| 3,407,320 | 10/1968 | McLean | 310/254 |
| 3,551,784 | 12/1970 | Shaw et al. | 310/254 |
| 3,558,941 | 1/1971 | Brebbia et al. | 310/49 |
| 3,999,093 | 12/1976 | Kirtley, Jr. | 310/198 |
| 5,036,235 | 7/1991 | Kleckner | 310/90.5 |
| 5,191,251 | 3/1993 | Paratte | 310/309 |
| 5,240,003 | 8/1993 | Lancee et al. | 126/662.06 |
| 5,323,075 | 6/1994 | Denk et al. | 310/68 B |

FOREIGN PATENT DOCUMENTS

| | | |
|---|---|---|
| 62-189931 | 8/1987 | Japan . |
| 9210024 | 6/1992 | WIPO . |
| 9305712 | 4/1993 | WIPO . |

*Primary Examiner*—Steven L. Stephan
*Assistant Examiner*—Jonathan Link
*Attorney, Agent, or Firm*—Edward Blocker

[57] ABSTRACT

An electric micromotor comprising a stator winding, a rotor magnet (11) mounted for rotation about a rotor axis (13) and having permanent-magnet poles facing the stator winding, and electrical connection means for the electrical connection of the stator winding to a power source. The stator winding is formed by a cylindrical body (1) having an electrically conductive cylindrical wall (3) provided with longitudinal slots, which extend from an axial end face (15) of the cylindrical body over at least a part of the length of this body, to bound and form axially extending electrical conductors (5) for cooperation with the permanent-magnet poles. The conductors are mechanically interconnected by electrically insulating reinforcement means (19) at the location of the longitudinal slots.

19 Claims, 5 Drawing Sheets

ELECTRIC MICROMOTOR WITH A SLOTTED CONDUCTIVE BODY AS THE STATOR WITH INSULATING REINFORCEMENT IN THE SLOTS THEREOF

The invention relates to a radial-field electric micromotor comprising a stator winding, a rotor magnet mounted for rotation about a rotor axis and having permanent-magnet poles facing the stator winding, and electrical connection means for the electrical connection of the stator winding to a power source.

Such a motor is known from the PCT Application WO 92/10024 (herewith incorporated by reference). The known radial-field electric micromotor has a stator, a rotor with a rotor shaft and a bearing means for the rotor shaft. The rotor has a permanent-magnet rotor body with a plurality of radially oriented magnet poles disposed around and spaced from the rotor shaft and has a diameter of the order of magnitude of 1 mm. The stator has a cylindrical stator housing and a stator winding formed by turns arranged on an inner wall of the stator housing and having connecting ends. These ends are connected to electrical connection members for electrically connecting the stator winding to a power source.

Owing to the small dimensions of micromotors a small well-defined air gap between the rotor body and the stator winding is required in order to guarantee a satisfactory electromagnetic operation. This means that both the rotor and the stator should meet stringent accuracy requirements. In this respect the stator winding used in the known electric motor poses manufacturing and assembly problems because this stator winding is formed by turns adapted to the curvature of the inner wall of the stator housing. These turns can be wound turns or printed turns provided on a substrate adapted to the curved inner wall. In both cases the known construction requires additional steps in order to achieve the required accuracies during manufacture and assembly. Moreover, additional operations are necessary to position the turns correctly relative to one another and relative to the rotor body during assembly. Moreover, additional provisions are required to lead the connecting ends of the turns to the connection members.

It is one of the objects of the invention to provide a micromotor of the type defined in the opening paragraph, which has a simple shape, comprises a small number of parts and can be manufactured easily.

The electric micromotor in accordance with the invention is characterised in that the stator winding is a cylindrical body having an electrically conductive cylindrical wall provided with longitudinal slots, which extend from an axial end face of the cylindrical body over at least a part of the length of said body, to bound axially extending electrical conductors for cooperation with the permanent-magnet poles, which conductors are mechanically interconnected by electrically insulating reinforcement means at the location of the longitudinal slots. For reasons of symmetry it is preferred to arrange the longitudinal slots regularly spaced around the rotor axis. The measures taken give the stator winding of the micromotor in accordance with the invention such a strength and rigidity that it can also function as chassis. The rotor magnet is preferably made of a high-grade material such as $SmCO_5$ or $Sm_2CO_{17}$. In a three-phase version the number of conductors is three or a multiple of three and in a four-phase version this is four or a multiple of four.

An embodiment of the micromotor in accordance with the invention is characterised in that the reinforcement means extend in the longitudinal slots and comprise an electrically insulating material which adheres to the conductors. In this motor a stable stator winding is obtained in a surprisingly simple manner, while the reinforcement means occupy only a minimal space. A suitably adhering electrically insulating material is, for example, a two-component epoxy resin.

An embodiment of the micromotor in accordance with the invention is characterised in that the electrical conductors are provided with electrical connection means near their free ends.

An embodiment of the micromotor in accordance with the invention is characterised in that the electrical connection means include contact sockets in the cylindrical wall for the insertion of contact pins.

An embodiment of the micromotor in accordance with the invention is characterised in that the electrical connection means include contact faces facing the rotor axis for cooperation with contact elements of a connector. To connect the micromotor to a power source the connector should simply be inserted axially into the cylindrical body, thereby causing those contact faces of the contact elements which are remote from the rotor shaft to engage with said contact faces of the connection means.

An embodiment of the micromotor in accordance with the invention is characterised in that it has a bearing system secured to the stator winding to support the rotor magnet. The bearing system, which may comprise one or two bearings, is intended to allow the rotor magnet to rotate with minimal friction. A suitable bearing is, for example, a sapphire plain bearing. The stator winding guarantees a stable bearing arrangement, the cylindrical shape ensuring an accurate alignment of the bearing system which is secured directly to the stator winding.

An embodiment of the micromotor in accordance with the invention is characterised in that the rotor magnet has an axial dimension smaller than the corresponding dimension of the stator winding, the rotor magnet being disposed in a central area in the stator winding. This micromotor mitigates the generation of axially directed forces of electromagnetic origin which may be exerted on the rotor body. Such forces may adversely affect the rotation characteristics of the motor.

An embodiment of the micromotor in accordance with the invention is characterised in that the electrical conductors are constructed as rod-shaped elements.

An embodiment of the micromotor in accordance with the invention is characterised in that the electrically conductive cylindrical body is made of a material which is both electrically and magnetically conductive. This electric motor simply and effectively provides magnetic shielding from external magnetic fields and/or external soft-magnetic objects. In order to minimise detent torques the rotor body is preferably magnetised diametrally. A suitable electrically and magnetically conductive material is, for example, magnetic iron.

A magnetic shielding is also obtained with an micromotor in accordance with the invention which is characterised in that the cylindrical body is disposed in a soft-magnetic cylindrical element which is arranged so as to be electrically insulated from the stator winding. In order to minimise the outer diameter of the micromotor it is preferred to interpose a thin electrically non-conductive layer, for example of an epoxy resin, between the cylindrical body and the cylindrical element.

An embodiment of the radial-field micromotor in accordance with the invention is characterised in that the rotor magnet is circularly cylindrical and is homogeneously magnetised diametrically, the electrical conductors being regularly spaced about the rotor axis. This micromotor gives rise to an induced sinusoidal voltage system in the conductors. This provides a simple possibility of creating a torque which is constant as a function of time by powering with a matching sinusoidal symmetrical current system.

The invention further relates to a cylindrical body suitable for use in the micromotor in accordance with the invention.

The invention further relates to a method of manufacturing the micromotor in accordance with the invention and in this respect aims at providing a simple method comprising a small number of steps.

The method in accordance with the invention of manufacturing the micromotor in accordance with the invention is characterised by the following steps: forming a plurality of longitudinal slots in at least a part of a body of an electrically conductive material, which slots extend radially with respect to a pre-defined longitudinal axis, at least partly filling the resulting longitudinal slots with an electrically insulating material which adheres to the electrically conductive material, hollowing out the body with the at least partly filled longitudinal slots parallel to the longitudinal axis to form a cylindrical body with a circularly cylindrical inner space, mounting a rotor magnet in said space and supporting it in the cylindrical body. This method can be carded out by means of tools which are known per se. The longitudinal slots are preferably formed by means of spark erosion but they can also be obtained in another manner, for example by cutting.

The invention further relates to an axial-field electric micromotor comprising a stator winding, a rotor magnet mounted for rotation about a rotor axis and having permanent-magnet poles facing the stator winding, and electrical connection means for the electrical connection of the stator winding to a power source.

To this end the invention aims at modifying the electric motor known from WO 92/10024 so as to obtain a simple and easy-to-manufacture axial-field micromotor comprising a small number of parts.

The axial-field electric motor in accordance with the invention is characterised in that the stator winding is an electrically conductive disc body having radial slots which extend from a circumferential edge over at least a part of its radius to form radially extending electrical conductors for cooperation with the permanent-magnet poles, which conductors are mechanically interconnected by electrically insulating reinforcement means at the location of the radial slots. The rotor magnet is preferably made of a high-grade magnetic material, such as $SmCO_5$ or $Sm_2CO_{17}$ and is magnetised substantially in an axial direction. The conductors are preferably made of a satisfactorily electrically conductive material such as copper. For reasons of symmetry the radial slots are preferably spaced regularly around the rotor shaft.

An embodiment of the miniature motor in accordance with the invention is characterised in that the reinforcement means extend in the radial slots and comprise an electrically insulating material which adheres to the conductors. In this self-supporting stator winding the reinforcement means occupy only a minimal space. A suitable adhesive electrically insulating material is, for example, a two-component epoxy resin.

Near their free ends the conductors of the micromotor in accordance with the invention may have electrical connection elements for cooperation with contact elements connected to a power source. The special features of the stator winding enable a bearing system for the rotor magnet to be secured to the stator winding.

The electric motor in accordance with the invention can be of very small dimensions. The radial-field micromotor may have, for example, an outer diameter smaller than 1.0 mm and a length smaller than 2.0 mm. Owing to these small dimensions and its reliability the micromotor in accordance with the invention is particularly suitable for use in intravascular ultrasound scanning systems.

Figure 2:
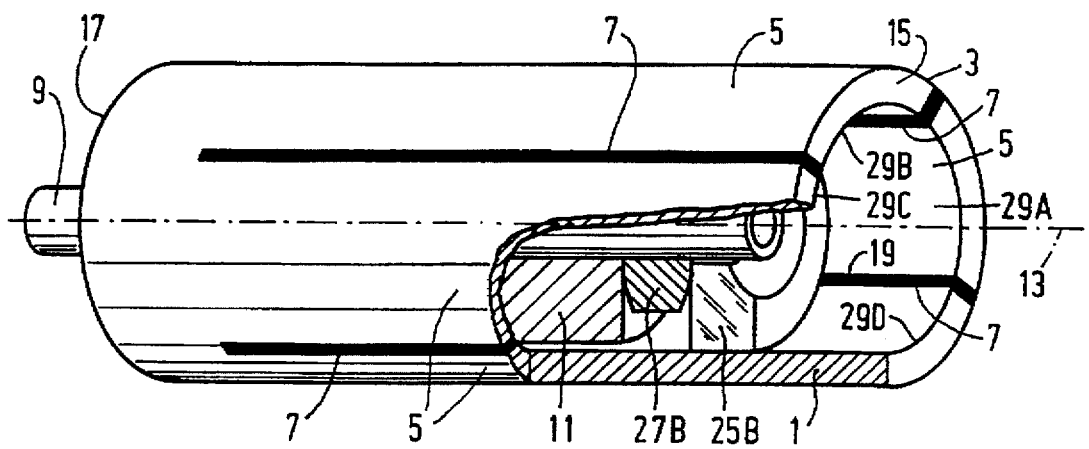
Figure 3:
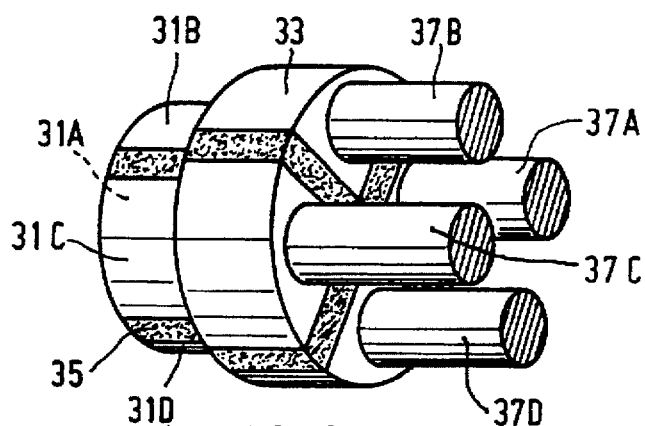
Figure 4A:
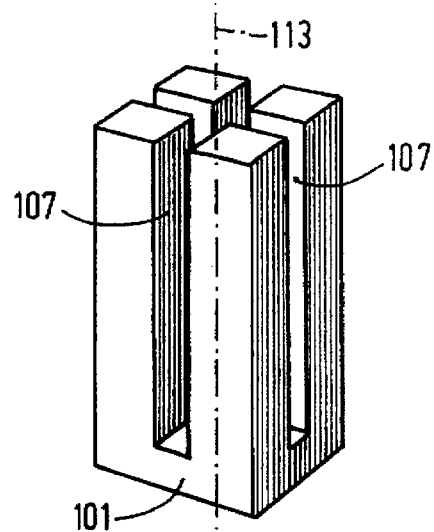
Figure 4B:
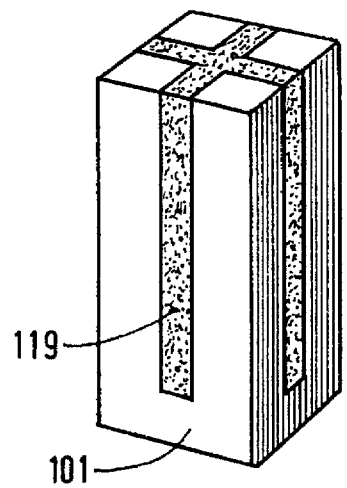
Figure 4C:
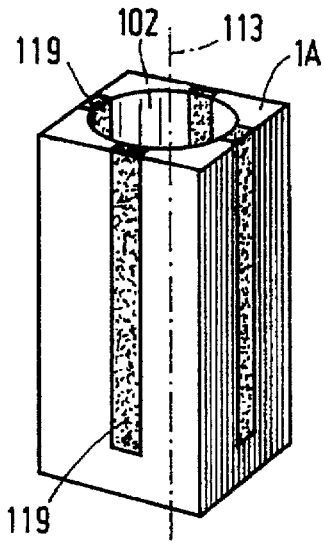
Figure 4D:
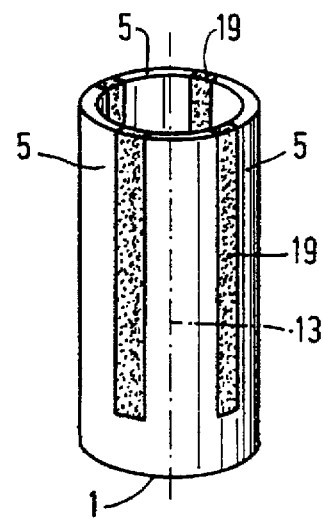
Figure 5:
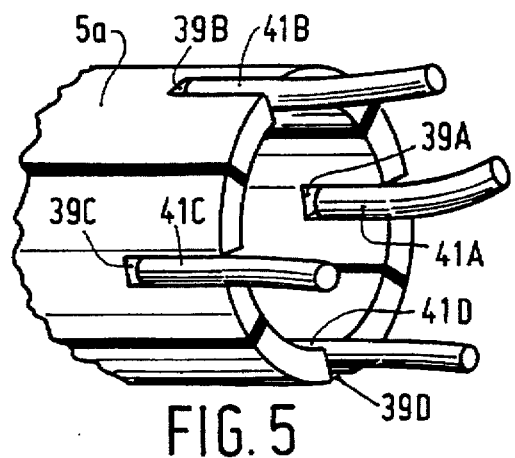
Figure 6:
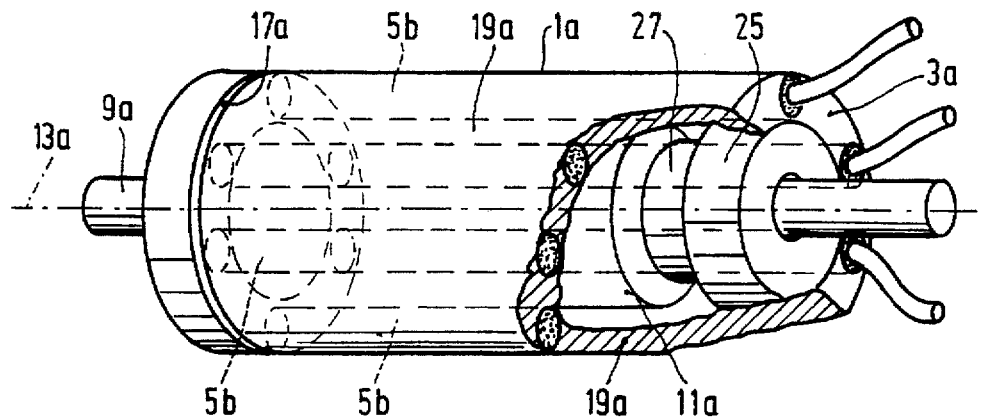
Figure 7:
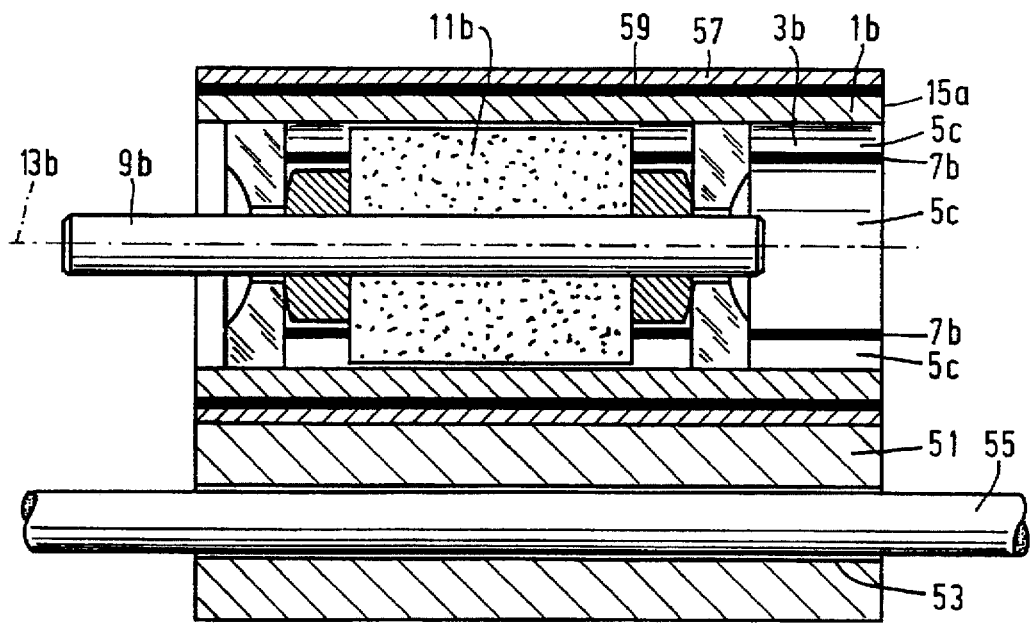
Figure 8:
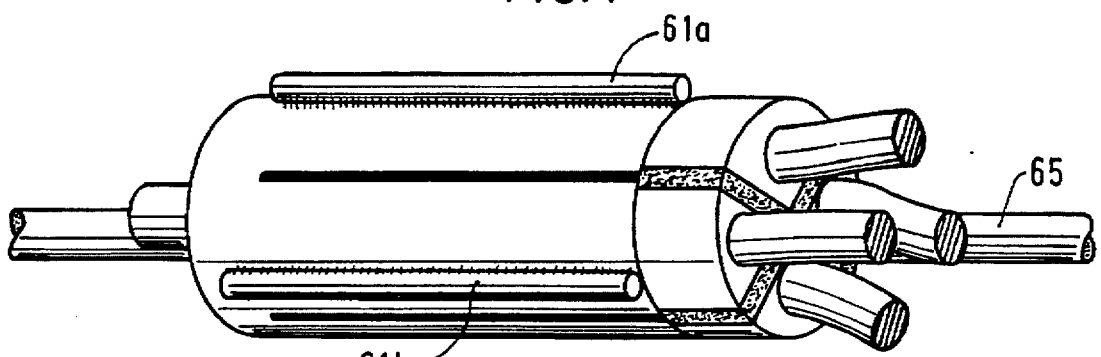
Figure 9:
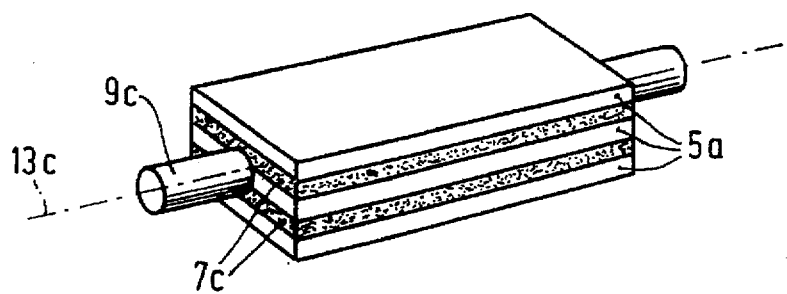
Figure 10:
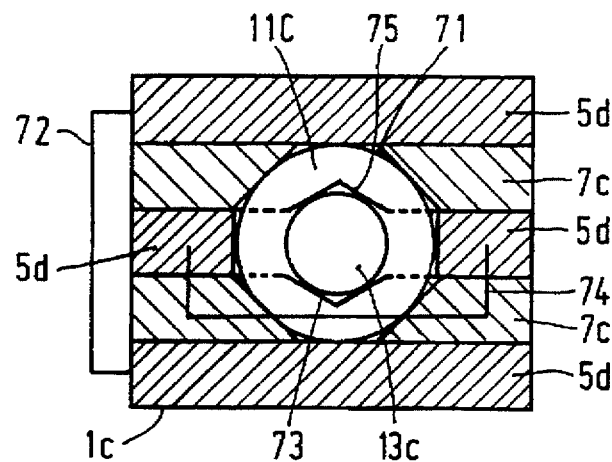
Figure 11:
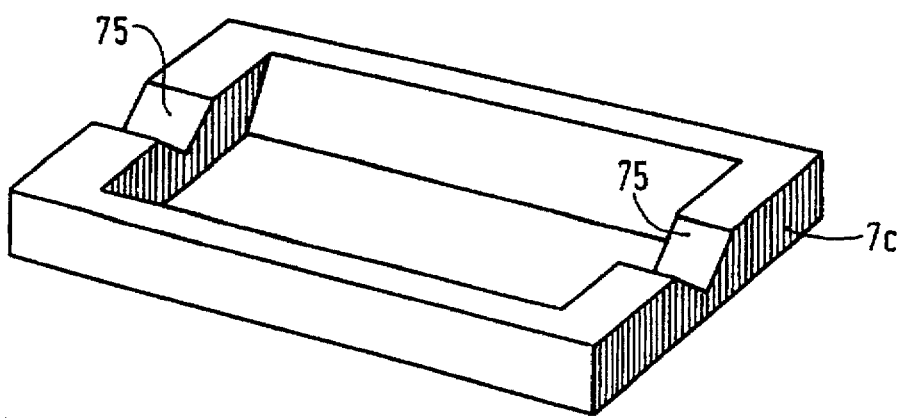
Figure 12:
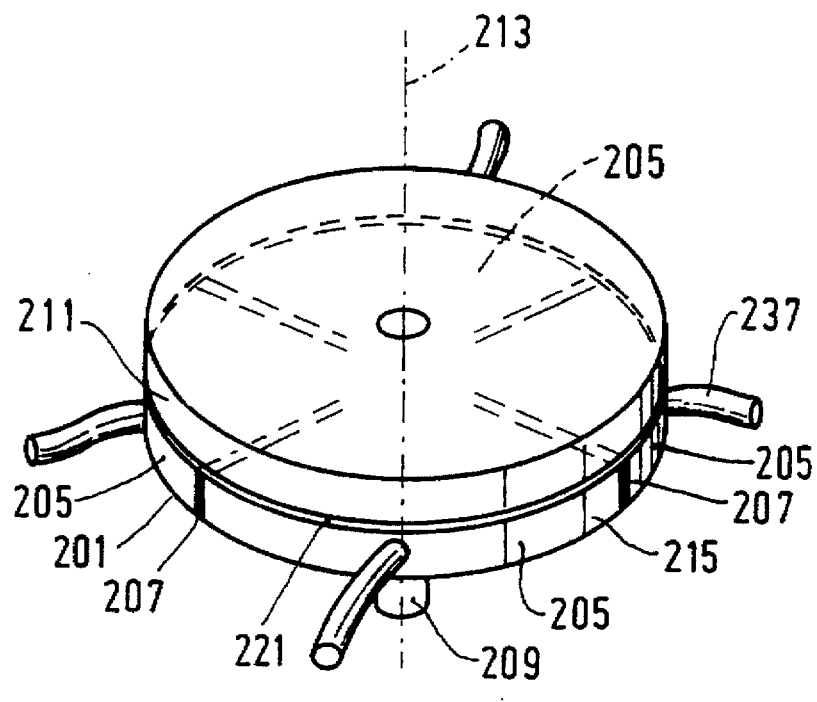
Figure 13:
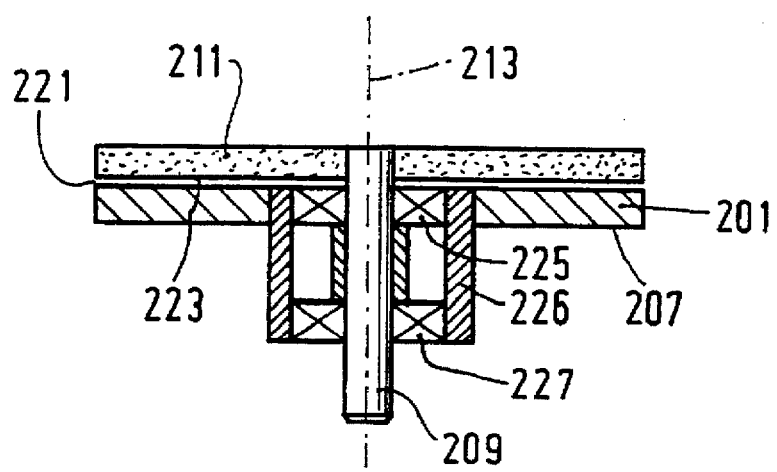

The invention will now be described in more detail, by way of example, with reference to the drawings, in which FIG. 1 is a diagrammatic longitudinal sectional view showing a first embodiment of the radial-field micromotor in accordance with the invention, FIG. 2 is a diagrammatic perspective view showing a part of the first embodiment, FIG. 3 is a diagrammatic perspective view showing a connector suitable for cooperation with the first embodiment, FIGS. 4A to 4D diagrammatically illustrate various steps of the method in accordance with the invention, FIG. 5 is a diagrammatic perspective view showing a part of a second embodiment, FIG. 6 is a diagrammatic perspective view showing a part of a third embodiment, FIG. 7 is a diagrammatic longitudinal sectional view showing a fourth embodiment, FIG. 8 is a diagrammatic perspective view showing a fifth embodiment, FIG. 9 is a diagrammatic perspective view showing a sixth embodiment, FIG. 10 is a diagrammatic cross-sectional view showing the sixth embodiment, FIG. 11 a diagrammatic perspective view showing a part of the sixth embodiment, FIG. 12 is a diagrammatic perspective view showing an embodiment of the axial-field micromotor in accordance with the invention, and FIG. 13 is a diagrammatic longitudinal sectional view showing the embodiment of the axial-field micromotor.

The first embodiment of the radial-field micromotor in accordance with the invention shown in FIGS. 1 and 2 has a cylindrical body 1 with a cylindrical wall 3 provided with electrically conductors 5 of, for example, copper, and electrically insulating longitudinal slots 7. The cylindrical body 1 accommodates a bearing system and a rotor magnet 11 secured to a motor shaft 9, the central axis of the motor shaft 9 coinciding with a rotor axis 13.

The longitudinal slots 7 in the cylindrical wall 3 extend from an axial end face 15 over a substantial part of the length of the cylindrical body 1 and are regularly spaced about the rotor axis. The conductors 5, which take the form of axial cylindrical wall portions and which extend between the longitudinal slots, are interconnected both mechanically and electrically near an end face 17. In order to reinforce the cylindrical body 1 the longitudinal slots 7 are wholly or, if desired, locally filled with an electrically insulating material 19, for example a two-component epoxy resin, which adheres to the conductors 5. Apart from excellent electrical properties the cylindrical body 1 of this construction also has excellent mechanical properties, as a result of which it can function both as stator winding and as chassis. As stator body the cylindrical body, when energised, cooperates with permanent-magnet poles 23A and 23B of the rotor magnet 11 via an air gap 21. In the present example the number of conductors 5 is four and the rotor magnet 11, which is preferably made of a high-grade material such as NbFeB, is magnetised diametrically. As chassis the cylindrical body 1 serves to mount bearings. To support the motor shaft 9 the bearing system in the micromotor comprises two radial plain bearings 25A and 25B, which are secured directly to the cylindrical body 1, and two axial bearings 27A and 27b. The rotor magnet, which is disposed between the bearings 25A, 27A and the bearings 25B, 27B has a smaller axial length than the stator winding and is situated substantially in a central part thereof.

The micromotor shown in FIGS. 1 and 2 has contact faces 29A, 29B, 29C and 29D, which face the rotor shaft 13, for cooperation with contact elements 31A, 31B, 31C and 31D of a connector 33 shown in FIG. 3, for the electrical connection of the stator winding to an external power source. The contact elements 31A, 31B, 31C and 31D, which are insulated from one another by insulating layers 35, are connected to conductor wires 37A, 37B, 37C and 37D, respectively, of a supply lead.

The micromotor shown in FIGS. 1 and 2 can be manufactured in a number of steps. A particularly suitable method will be described with reference to FIGS. 4A to 4D. This method, which falls within the scope of the invention, is based on a body 101 of an electrically and magnetically conductive material, for example magnetic iron, which is formed with a plurality of longitudinal slots 107 parallel to a pre-defined longitudinal axis 113. These longitudinal slots 107 can be formed by means of techniques known per se, such as cutting but the use of spark erosion is to be preferred. For mechanical reinforcement of the body 101 the longitudinal slots 107 are filled wholly or partly with an electrically insulating material, for example an epoxy resin, which adheres to the material of the body 101. Subsequently, the body 101 is hollowed out parallel to the longitudinal axis 113, for example by drilling, to form a cylindrical body 1A having a circularly cylindrical inner space 102. If desired, for example in order to minimise the outer dimensions, the cylindrical body 1A may be machined to give it a circularly cylindrical outer circumference. The cylindrical body 1 thus obtained is shown in FIG. 4D and corresponds to the cylindrical body 1 shown in FIGS. 1 and 2.

To finish the micromotor in accordance with the invention a rotor magnet is mounted and journalled in the space 101 inside the cylindrical body 1 or 1A. The rotor magnet and the bearing means for this magnet have already been described with reference to FIGS. 1 and 2.

FIG. 5 shows a part of a second embodiment of the radial-field micromotor in accordance with the invention. The parts not shown are identical to the corresponding parts of the electric motor shown in FIGS. 1 and 2. The second embodiment has electrical conductors 5a, each having contact sockets 39A, 39B, 39C and 39D, which extend in the cylindrical wall, particularly in axial directions, for cooperation with respective removable electrical plug-in contact pins 41A, 41B, 41C and 41D of an external power source.

The third embodiment of the radial-field micromotor in accordance with the invention shown in FIG. 6 comprises a stator winding and a rotor magnet 11a mounted for rotation about rotor axis 13a and having permanent-magnet poles facing the stator winding. The stator winding is formed by cylindrical body 1a having a cylindrical wall 3a provided with rod-shaped electrical conductors 5b extending parallel to the rotor axis 13a and longitudinal slots 19a extending between the conductors 5b and filled at least partly with an insulating reinforcement material. The electrical conductors 5b in the form of rod-shaped elements are electrically interconnected via an electrically conductive ring 17a near an end face of the electric motor. In the present example the stator winding 6 has conductors. The rotor magnet 11a, which is secured to a motor shaft 9a, is supported in a manner similar to that shown in FIGS. 1 and 2, i.e. by means of a bearing system which is secured directly to the stator winding. At both end faces of the micromotor the bearing system comprises a radial bearing 25 and an axial bearing 27, the bearings 25 being secured directly to the cylindrical body 1a.

The fourth embodiment of the micromotor in accordance with the invention shown in FIG. 7 comprises a rotor magnet 11b mounted for rotation about rotor axis 13b, secured to a motor shaft 9b and having magnet poles facing a stator winding. The stator winding is cylindrical body 1b having an electrically conductive cylindrical wall 3b in which longitudinal slob 7b extend in axial directions from an end face 15a. The longitudinal slots 7b, which are filled at least partly with an electrically insulating material, extend over a part of the cylindrical body to bound and mutually insulate electrical conductors 5c, which extend in axial directions. The electrical conductors 5c are similar in shape to the conductors 5 of the electric motor shown in FIGS. 1 and 2. The bearing means for the motor shaft 9b can be similar to the bearing means shown in FIGS. 1 and 2.

The micromotor shown in FIG. 7 has a support 51 with a guide channel 53 for cooperation with an external plastics or metal guide wire or rod 55. The micromotor further has a cylindrical element 57 of a soft-magnetic material fitted around the stator winding to provide shielding from possible undesirable magnetic effects. An electrically non-conductive layer 59 is interposed between the cylindrical body 1b and the cylindrical element 57.

Instead of the cylindrical element 57 used in the micromotor shown in FIG. 7 the embodiment shown in FIG. 8 comprises two soft-magnetic compensation elements 61a and 61b, which are positioned on the stator winding so as to compensate for a magnetic disturbance caused by a guide wire or rod 65 having magnetic properties.

The embodiment of the radial-field electric micromotor in accordance with the invention shown in FIGS. 9, 10 and 11 comprises a planar-type stator winding. The stator winding is a cylindrical body 1c comprising a plurality of conductors arranged in layers between which longitudinal slots 7c formed by insulating layers are disposed. A rotor magnet 11c is mounted on a motor shaft 9c in a central space 71. The motor shaft 13c is mounted for rotation about a rotor axis 13c in a bearing means 73, 75. The micromotor further has two connecting wires 72 and 74.

The axial-field electric micromotor in accordance with the invention shown in FIGS. 12 and 13 comprises a stator winding, a rotor magnet 211 mounted for rotation about a rotor axis 213 and having permanent-magnet poles 223 facing the stator winding, and electrical connection means 237 for the electrical connection of the stator winding to an external power source. The stator winding is formed by an electrically conductive disc body 201 having radial slots 207 which extend from a circumferential edge 215 to form radial conductors 205 for cooperation with the magnet poles via an air gap 221. The radial slots 207 are filled at least partly with an electrically insulating material which adheres to the conductors 205 to reinforce the stator winding. The rotor magnet 211, which has for example two magnet poles, is mounted on a motor shaft 209, which is supported in a bearing system 226 which is secured to the stator winding and which may comprise, for example, two bearings 225, 227.

It is to be noted that the invention is not limited to the embodiments shown herein. For example, the number of electrical conductors may differ from the numbers specified herein.

We claim:

1. A radial-field electric micromotor comprising a stator winding, a rotor magnet mounted for rotation about a rotor axis and having permanent-magnet poles facing the stator winding, and electrical connection means for the electrical connection of the stator winding to a power source, characterised in that the stator winding is a cylindrical body having an electrically conductive cylindrical wall provided with longitudinal slots which extend from an axial end face of the cylindrical body over at least a part of the length of said body to form axially extending electrical conductors for generating a stator field for cooperation with the permanent-magnet poles of the rotor magnet, which conductors are mechanically interconnected by electrically insulating reinforcement means at the location of the longitudinal slots.

2. A micromotor as claimed in claim 1, characterised in that the longitudinal slots are regularly spaced about the rotor axis.

3. A micromotor as claimed in claim 1, characterised in that the reinforcement means extend in the longitudinal slots and comprise an electrically insulating material which adheres to the conductors.

4. A micromotor as claimed in claim 1, characterised in that the electrical conductors are provided with electrical connection means near their free ends.

5. A micromotor as claimed in claim 1, characterised in that it has a bearing system secured to the stator winding to support the rotor magnet.

6. A micromotor as claimed in claim 1, characterised in that the rotor magnet has an axial dimension smaller than the corresponding dimension of the stator winding, the rotor magnet being disposed in a central area in the stator winding.

7. A micromotor as claimed in claim 1, characterised in that the electrical conductors are constructed as rod-shaped elements.

8. A micromotor as claimed in claim 1, characterised in that the electrically conductive cylindrical body is made of a material which is both electrically and magnetically conductive.

9. A micromotor as claimed in claim 1, characterised in that the cylindrical body is disposed in a soft-magnetic cylindrical element which is arranged so as to be electrically insulated from the stator winding.

10. A micromotor as claimed in claim 9, characterised in that an electrically non-conductive layer extends between the cylindrical body and the cylindrical element.

11. A micromotor as claimed in claim 1, characterised in that the rotor magnet is circularly cylindrical and is homogeneously magnetised diametrically, the electrical conductors being regularly spaced about the rotor axis.

12. An axial-field electric micromotor comprising a stator winding, a rotor magnet mounted for rotation about a rotor axis and having permanent-magnet poles facing the stator winding, and electrical connection means for the electrical connection of the stator winding to a power source, characterised in that the stator winding is an electrically conductive disk body having radial slots which extend from a circumferential edge over at least a part of its radius to form radially extending electrical conductors for generating a stator field for cooperation with the permanent-magnet poles of the rotor magnet, which conductors are mechanically interconnected by electrically insulating reinforcement means at the location of the radial slots.

13. A micromotor as claimed in claim 12, characterised in that the radial slots are regularly spaced about the rotor axis.

14. A micromotor as claimed in claim 12, characterised in that the reinforcement means extend in the radial slots and comprise an electrically insulating material which adheres to the conductors.

15. A micromotor as claimed in claim 12, characterised in that the electrical conductors are provided with electrical connection means near their free ends.

16. A micromotor as claimed in claim 12, characterised in that it has a bearing system secured to the stator winding to support the rotor magnet.

17. A radial-field electric micromotor comprising a stator winding, a rotor magnet mounted for rotation about a rotor axis and having permanent-magnet poles facing the stator winding, and electrical connection means for the electrical connection of the stator winding to a power source, characterised in that the stator winding is a cylindrical body having an electrically conductive cylindrical wall provided with longitudinal slots which extend from an axial end face of the cylindrical body over at least a part of the length of said body to bound axially extending electrical conductors for cooperation with the permanent-magnet poles, which conductors are mechanically interconnected by electrically insulating reinforcement means at the location of the longitudinal slots, the electrical conductors are provided with electrical connection means near their free ends and the electrical connection means include contact sockets in the cylindrical wall for the insertion of contact pins.

18. A radial-field electric micromotor comprising a stator winding, a rotor magnet mounted for rotation about a rotor axis and having permanent-magnet poles facing the stator winding, and electrical connection means for the electrical connection of the stator winding to a power source, characterised in that the stator winding is a cylindrical body having an electrically conductive cylindrical wall provided with longitudinal slots which extend from an axial end face of the cylindrical body over at least a part of the length of said body to bound axially extending electrical conductors for cooperation with the permanent-magnet poles, which conductors are mechanically interconnected by electrically insulating reinforcement means at the location of the longitudinal slots, the electrical conductors are provided with electrical connection means near their free ends and the electrical connection means include contact faces facing the rotor axis for cooperation with contact elements of a connector.

19. A radial-field electric micromotor comprising a stator winding, a rotor magnet mounted for rotation about a rotor axis and having permanent-magnet poles facing the stator winding, and electrical connection means for the electrical connection of the stator winding to a power source, characterised in that the stator winding is a cylindrical body having an electrically conductive cylindrical wall provided with longitudinal slots which extend from an axial end face of the cylindrical body over at least a part of the length of said body to bound axially extending electrical conductors for cooperation with the permanent-magnet poles, which conductors are mechanically interconnected by electrically insulating reinforcement means at the location of the longitudinal slots, and soft-magnetic compensation elements are disposed on the cylindrical body.

* * * * *